Aug. 30, 1960

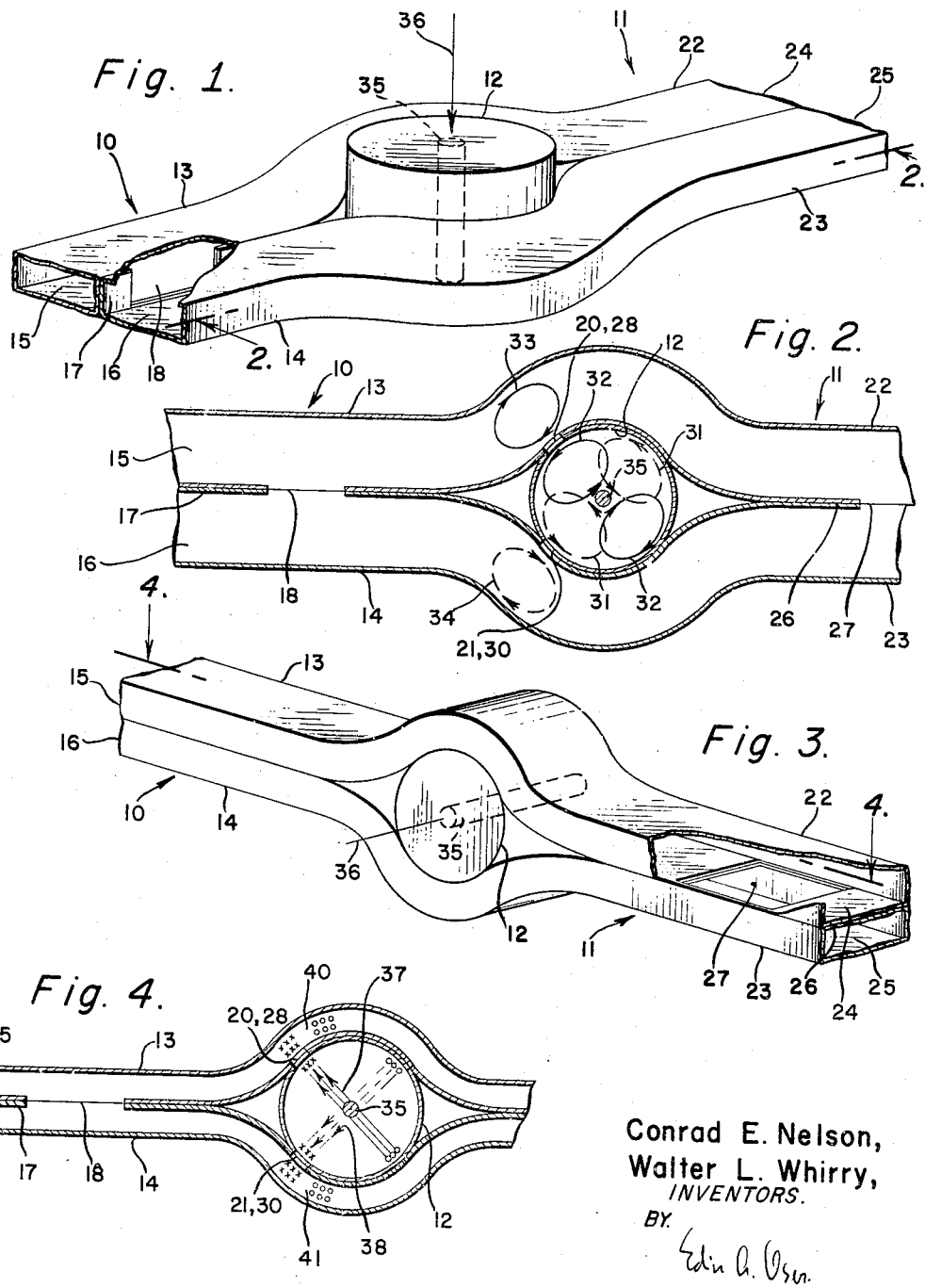

C. E. NELSON ET AL 2,951,216

REFLECTIONLESS MICROWAVE FILTER

Filed Dec. 17, 1956

Conrad E. Nelson,
Walter L. Whirry,
INVENTORS.

BY

Edin A. Osm.

AGENT

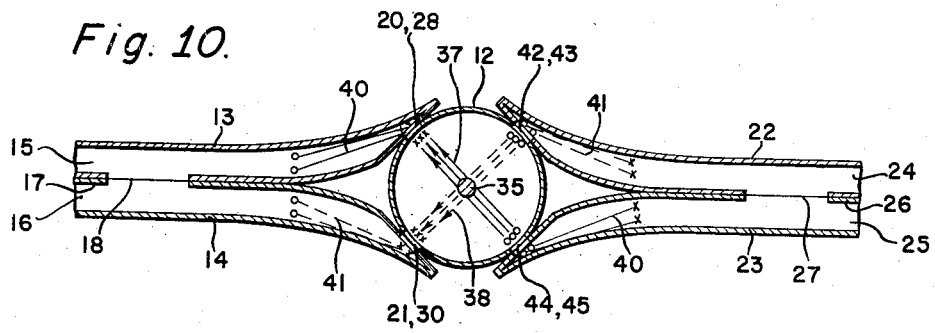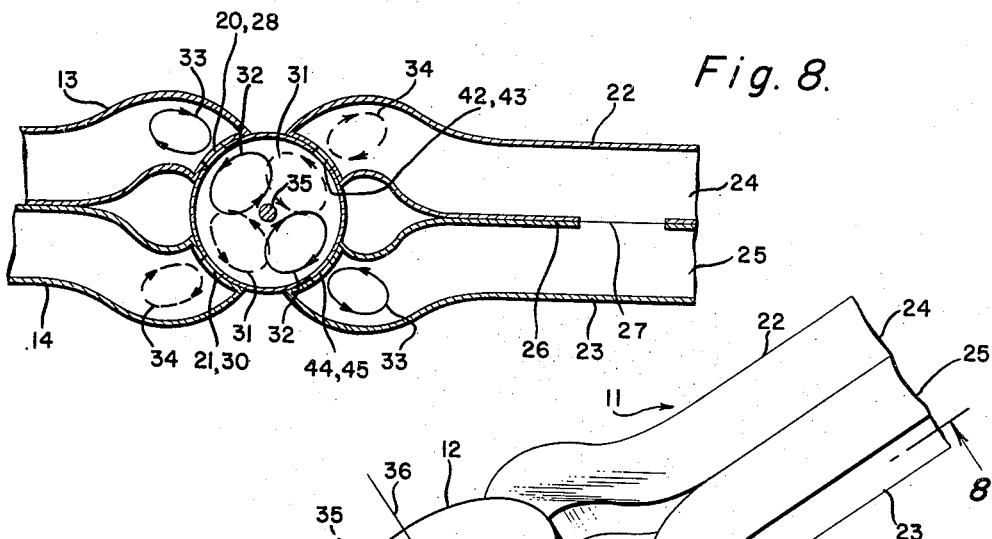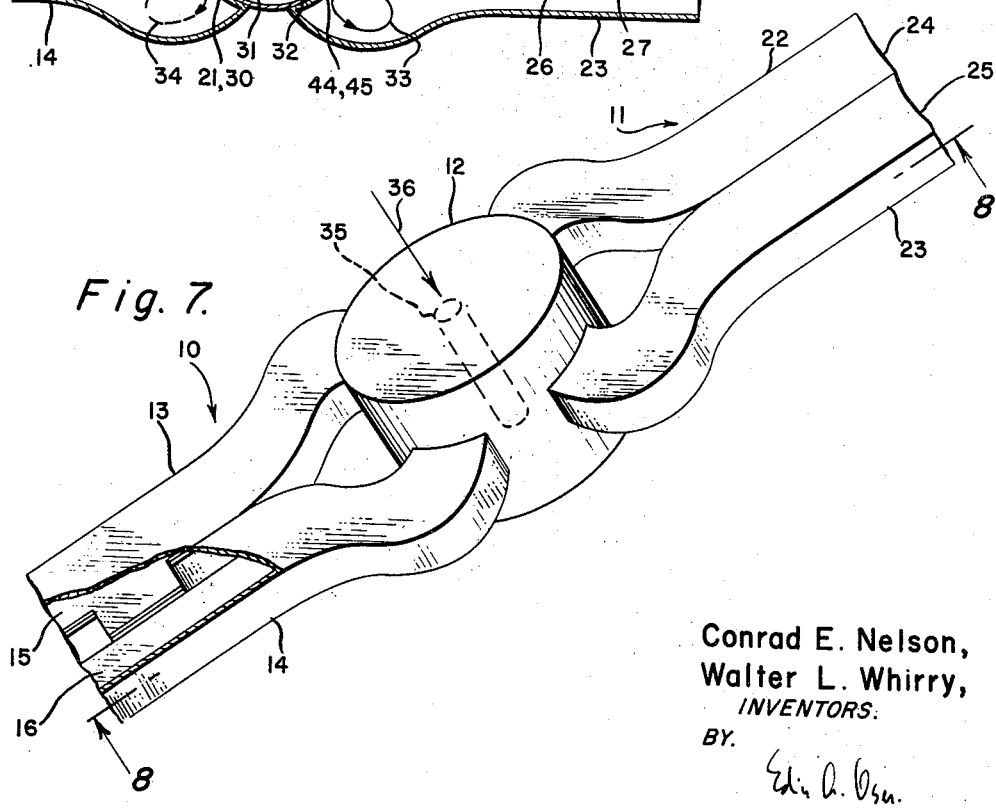

United States Patent Office 2,951,216
Patented Aug. 30, 1960

2,951,216

REFLECTIONLESS MICROWAVE FILTER

Conrad E. Nelson, Gardena, and Walter L. Whirry, Inglewood, Calif., assignors to Hughes Aircraft Company, Culver City, Calif., a corporation of Delaware Filed Dec. 17, 1956, Ser. No. 628,852

6 Claims. (Cl. 333—9)

The present invention relates to microwave filters in general and more particularly to a microwave filter that can be made reflectionless, tunable and non-reciprocal with the use of only one resonant cavity.

Until relatively recent times, it was always necessary to use at least two microwave cavities or one cavity and another type of microwave component, such as a ferrite isolator or a magic tee, to produce a reflectionless microwave filter capable of coupling substantial amounts of power from the main waveguide at resonance. Furthermore, it was never possible to make any of the prior art microwave filters tunable to different frequencies and, at the same time, make them non-reciprocal and reflectionless at each of the different resonant frequencies. These problems were resolved by the invention of a single cavity filter, several embodiments of which are shown and described in copending U.S. patent applications, Serial No. 574,525 for "A Non-Reciprocal, Tunable Reflectionless Band Elimination Microwave Filter," by Conrad E. Nelson, filed March 28, 1956, and now abandoned, and in copending U.S. patent application, Serial No. 580,357 for "A Non-Reciprocal, Tunable, Reflectionless Microwave Filter," by Conrad E. Nelson, filed April 24, 1956, and now abandoned.

As disclosed in the above-mentioned copending applications, a single cavity reflectionless filter can be made by coupling a cavity to a waveguide at a point of circular polarization of the waveguide magnetic field. By so doing, substantially all the power in the waveguide is coupled into the cavity at resonance wherein a circularly polarized field is excited. Any energy radiated back into the waveguide is circularly polarized in the same direction as the incident energy and, therefore, is propagated toward the output end of the waveguide. Thus, none of the incident energy is reflected.

A tunable and non-reciprocal as well as reflectionless filter may be achieved by inserting a ferrite material in the cavity at the point at which the magnetic field is circularly polarized. The resonant frequency of the cavity is dependent upon the permeability of the ferrite slug and the permeability, in turn, is dependent upon the intensity and direction of a direct-current magnetic field applied to the ferrite and the direction of energy flow through the waveguide. Accordingly, it will be obvious to those skilled in the art that the filter may be selectively tuned to different resonant frequencies by suitably varying the strength of the direct-current magnetic field and that the amount of power produced at the output end of the filter is determined by the direction of propagation through the waveguide.

Several of the embodiments of the filter shown and described in the referred to copending applications are also disclosed on pages 1449 through 1455 of an article entitled "Ferrite-Tunable Microwave Cavities and the Introduction of a New Reflectionless, Tunable Microwave Filter," by Conrad E. Nelson, in Proceedings of the IRE, October 1956 issue.

It will be seen from an examination of Nelson's applications as well as his article that the cavity coupling holes are in the end plates of the cavity. Accordingly, it will be obvious to those skilled in the art that with the coupling holes positioned thusly, it would be extremely difficult to design a compensating device to keep the resonant frequency of the cavity constant with variations in temperature. In the present invention, the waveguide sections do not couple to the cavity through the cavity end plates so that, as a result, end plate temperature compensation can be utilized. Furthermore, as shown by both the copending applications and the IRE article, the length of the direct-current flux path is increased by the added height of the waveguide sections. Since this addition to the flux path is entirely air gap, the intensity of the direct-current magnetic field applied to the ferrite slug is materially reduced. In the present invention, the waveguide sections are coupled to the cavity through the walls of the cavity rather than through their end plates. Consequently, the direct-current field used to affect the ferrite slug in the cavity may be applied directly to the end plates of the cavity rather than through the waveguide sections. This permits full strength of the direct-current magnetic field to be applied to the ferrite slug without requiring an additional expenditure of electrical power.

It is, therefore, an object of the present invention to provide a reflectionless microwave filter having a single cavity.

Another object of the present invention is to provide a reflectionless microwave filter having a single cavity for coupling substantially all the power from the main waveguide at resonance.

A further object of the present invention is to provide a reflectionless, non-reciprocal and tunable microwave filter.

It is an additional object of the present invention to provide a microwave filter of the type described wherein the filter waveguide sections are coupled to the filter cavity through the cavity walls rather than through their end plates.

It is still another object of the present invention to provide a microwave filter of the type described that permits a magnetic field to be applied directly to the cavity end plates.

It is a still further object of the present invention to provide a microwave filter of the type described that permits the end plates of the filter cavity to be included in any scheme for temperature compensation.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a perspective view, partly in cross-section, of one embodiment of a reflectionless, tunable and non-reciprocal microwave filter according to the present invention;

Fig. 2 is a top view in cross-section of the microwave filter of Fig. 1 and illustrates the configuration of the magnetic fields in the waveguide sections and cavity;

Fig. 3 is a perspective view, partly in cross-section, of another embodiment of a microwave filter according to the present invention;

Fig. 4 is a top view in cross-section of the microwave filter of Fig. 3 and illustrates the configuration of the magnetic fields in the waveguide and cavity sections of the filter;

Fig. 7 is a perspective view of a fourth embodiment of a reflectionless microwave filter according to the present invention;

Fig. 8 is a top view in cross-section of the microwave filter of Fig. 7 and illustrates the configuration of the magnetic fields in the waveguide and cavity sections of the filter;

Fig. 10 is a top view in cross-section of the microwave filter of Fig. 9 and illustrates the configuration of the magnetic fields in the waveguide and cavity sections of the filter.

Figure 5:
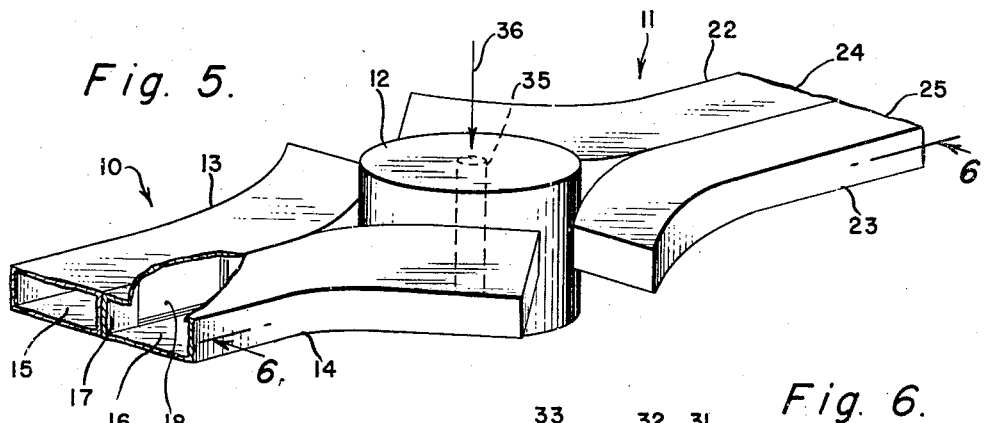
Fig. 5 is a perspective view, partly in cross-section, of a third embodiment of a reflectionless, tunable and non-reciprocal microwave filter according to the present invention.

Referring now to the drawings, wherein like reference characters designate like or corrsponding parts throughout the several views, there is shown in Figs. 1 and 2 a reflectionless microwave filter according to the present invention, the filter as shown being tunable and non-reciprocal as well as reflectionless by the addition thereto of a ferrite slug. As shown in the figures, the filter basically comprises a pair of directional couplers, generally designated 10 and 11, and a cavity structure 12 joined to the couplers both physically and electromagnetically.

Directional coupler 10 includes a pair of waveguide sections 13 and 14 having ports 15 and 16, respectively, and physically adjoining each other by means of a common waveguide wall 17 for a substantial part of the length of the waveguide sections. In the instant embodiment, common waveguide wall 17 is a narrow side of waveguide sections 13 and 14 and, as shown, the common wall includes an aperture therethrough, designated 18, through which electromagnetic energy is coupled from one waveguide section to the other. In the present invention, the elements of directional coupler 10 are designed so that electromagnetic energy propagated through waveguide sections 13 and 14 is divided equally between them, that is, coupler 10 is a 3 decibel directional coupler.

As shown in Fig. 1 and more clearly in Fig. 2, directional coupler 10 divides at one end thereof, the individual waveguide sections flaring outwardly along a curved path. It will be seen by referring to Fig. 2 that at the flared end of the coupler, each one of waveguide sections 13 and 14 has a coupling hole through the inner side wall, the coupling hole through the side wall of waveguide section 13 being designated 20 and the coupling hole through the side wall of waveguide section 14 being designated 21. The particular location of the coupling holes along their respective waveguide walls is determined by the location of corresponding coupling holes through cavity 12, as will be better understood later from the description below.

Directional coupler 11 similarly includes a pair of waveguide sections 22 and 23 having ports 24 and 25, respectively, these waveguide sections also adjoining each other by means of a common waveguide wall 26. As before, the common wall includes an aperture therethrough which, in coupler 11, is designated 27. Coupler 11 is also designed so that electro-magnetic energy propagated through waveguide sections 22 and 23 will be shared equally by them, that is, coupler 11 is also a 3 decibel directional coupler. Furthermore, like coupler 10, coupler 11 divides at one end thereof, waveguide sections 22 and 23 flaring outwardly along a curved path.

It should be noted, however, that although couplers 10 and 11 appear to be identical, they are dissimilar in one respect, namely, waveguide sections 22 and 23 do not have the coupling holes that are found through the waveguide sections of coupler 10. It should additionally be noted that waveguide sections 13 and 14 meet and join with waveguide sections 22 and 23, respectively, to form contiguous waveguides. In subsequent embodiments, the waveguide sections remain separate and distinct entities but in this embodiment the waveguide sections are combined to give unobstructed paths to the propagated electromagnetic energy, as may be seen from the figures.

Cavity 12 is cylindrical in shape and is positioned between the waveguide sections of directional couplers 10 and 11 in the manner shown in both Figs. 1 and 2. Moreover, cavity 12 has a pair of coupling holes 28 and 30 through the cavity wall that are aligned with coupling holes 20 and 21, respectively, to electromagnetically couple the cavity both to waveguide section 13 and waveguide section 14. Coupling holes 28 and 30 are preferably angularly spaced from each other in such a manner that the projection of these coupling holes on a plane perpendicular to the axis of cavity 12 forms an angle of substantially ninety degrees with the projection of the axis on the same plane. In other words, coupling hole 30 is spaced substantially one quarter the way around the cavity wall periphery from coupling hole 28. The particular spacing provided between coupling holes 28 and 30 is for the purpose of electromagnetically coupling waveguide section 13 to one cavity mode and waveguide section 14 to the other cavity mode of two orthogonal cavity modes, as will be described more fully below.

In operation, when an electromagnetic signal, preferably in the form of a plane polarized mode, such as a $TE_{10}$ mode, is applied to port 15, approximately fifty percent of the signal energy is coupled from waveguide section 13 through aperture 18 into waveguide section 14. In other words, the applied signal energy is divided equally between waveguide sections 13 and 14 so that two signals of substantially equal energy content are propagated toward ports 24 and 25 in the two waveguide sections of directional coupler 10. However, as will be recognized by those skilled in the art, the signal propagated through waveguide section 14 is ninety degrees out of phase with the signal propagated through waveguide section 13.

The electromagnetic energy in waveguide sections 13 and 14 is coupled through coupling holes 20, 21, 28 and 30 into cavity 12 wherein, as a result, two orthogonal $TM_{110}$ cavity modes are excited which are illustrated in Fig. 2 by arrows 31 and 32, arrow 31 illustrating one $TM_{110}$ mode and arrows 32 illustrating the other $TM_{110}$ mode. More particularly, since the coupling holes are spaced ninety degrees apart, as previously mentioned, one cavity mode is coupled solely to the signal in one waveguide section and the other cavity mode is coupled solely to the signal in the other waveguide section. In other words, each of the two signals excites a cavity mode independently of the other.

This phenomena is illustrated in Fig. 2 by arrows 33 and 34 in waveguide sections 13 and 14, respectively, arrow 33 representing the magnetic field of the signal propagated in waveguide section 13 and arrow 34 representing the magnetic field of the signal propagated in waveguide section 14. As may be seen from the arrows, the magnetic field of one $TM_{110}$ mode as represented by arrows 32 is electromagnetically coupled to the magnetic field, as represented by arrow 33, of the signal in waveguide section 13 and the magnetic field of the other $TM_{110}$ mode as represented by arrows 31 is electromagnetically coupled to the magnetic field, as represented by arrow 34, of the signal in waveguide section 14. Consequently, a dual $TM_{110}$ circularly polarized mode is produced in cavity 12 and, furthermore, waveguide sections 13 and 14 are not intercoupled through the cavity, that is, the microwave filter acts as if two separate cavities are present.

If the frequency of the applied signal is near the resonant frequency of cavity 12, then part of the energy of each cavity mode is reflected back into waveguide sections 13 and 14. Moreover, due to the nature of 3 decibel couplers, these reflections will add in waveguide section 14 and cancel, that is, subtract in waveguide section 13. Similarly, the applied and reflected signals will add in waveguide section 23 and cancel in waveguide section 22. It will be obvious, therefore, that the microwave filter of the present invention is reflectionless, operates as a band pass filter between ports 15 and 16, and operates as a band elimination filter between ports 15 and 25.

The microwave filter previously described has thus far been limited in its operation to a prescribed or predetermined frequency. However, the useful operating range of the filter may be considerably extended by inserting a ferrite slug 35 in cavity 12 and applying a direct-current magnetic field thereto as represented by arrow 36, whereby the filter is rendered tunable to different frequencies. More specifically, it is well known to those skilled in the ferrite art that the resonant frequency of cavity 12 may be varied by varying the permeability of ferrite slug 35 and that, in turn, the permeability may be varied by varying either the intensity or direction of direct-current magnetic field 36, or both. Thus, as mentioned above, the microwave filter is tunable because the resonant frequency of the cavity may be controlled by appropriately varying either the intensity or direction of the direct-current magnetic field, or both. The means, such as an electromagnet, for applying the direct-current magnetic field to the ferrite slug is not shown. It should be mentioned here again, however, that the direct-current magnetic field may be applied directly to the end plates of the cavity, which, as previously mentioned, is a distinct advantage over earlier devices of the same type. Similarly as to temperature compensation of the cavity.

With the ferrite slug added, the filter is also non-reciprocal because the resonant frequency of cavity 12 will be different if the energy enters port 15 than if it enters port 25. This is explained by the fact that the direction of rotation of the circularly polarized magnetic field in the cavity is determined by the direction of energy propagation through waveguide sections 13, 14, 22 and 23 and also by the fact that the permeability of the ferrite material and, therefore, the resonant frequency of the cavity, is affected by the direction of rotation of the above-mentioned cavity field.

The filter of Figs. 1 and 2 is constructed and adapted so that two orthogonal $TM_{110}$ modes are obtained in cavity 12. However, the filter of the present invention may also be constructed and adapted to provide two orthogonal $TE_{111}$ cavity modes. A microwave filter of the latter type is shown in Figs. 3 and 4.

As shown by the figures, the two filters are almost identical physically as well as operationally. Constructionwise, the only difference of any significance is that in the filter of Figs. 1 and 2, waveguide sections 13, 14, 22 and 23 are joined to each other and to cavity 12 by means of their narrow walls whereas in the filter of Figs. 3 and 4, the waveguide sections are joined to each other and the cavity through their broad faces or walls. Aside from this difference, the two filters are the same. Accordingly, no further description of the constructional features of the filter of Figs. 3 and 4 is deemed necessary. Operationally, the electrical performance of the filter of Figs. 3 and 4 is essentialy the same as the performance of the filter of Figs. 1 and 2, the only difference here being that the former excites two orthogonal $TE_{111}$ cavity modes whereas the latter excites two orthogonal $TM_{110}$ cavity modes. The magnetic fields of the orthogonal $TE_{111}$ modes excited in the filter cavity of Figs. 3 and 4 are represented by arrows 37 and 38 in Fig. 4, arrows 37 illustrating one $TE_{111}$ mode and arrow 38 illustrating the other $TE_{111}$ mode. The magnetic fields of the signals propagated in waveguide sections 13 and 14 are represented by arrows 40 and 41, respectively. As shown by the arrows, the magnetic field of one $TE_{111}$ cavity mode couples solely to the magnetic field in one waveguide section and the magnetic field of the other $TE_{111}$ cavity mode couples solely to the magnetic field in the other waveguide section. No further details concerning the operation of the filter of Figs. 3 and 4 are deemed essential since, as mentioned above, it is basically the same as that for the filters of Figs. 1 and 2.

Figure 6:
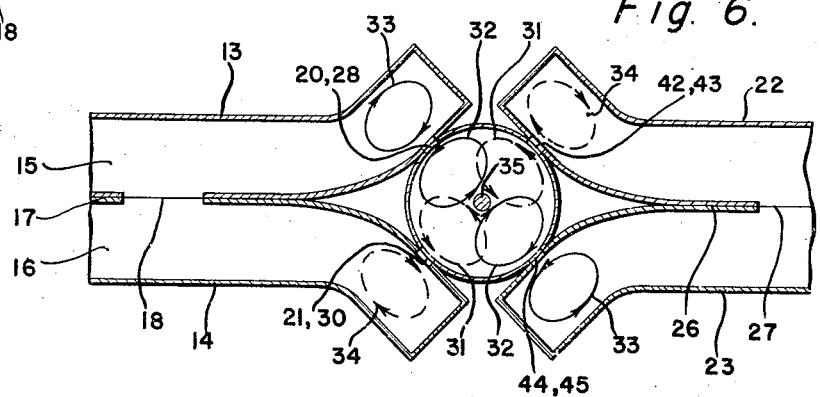
Fig. 6 is a top view in cross-section of the microwave filter of Fig. 5 and illustrates the configuration of the magnetic fields in the waveguide and cavity sections of the filter.
Figure 9:
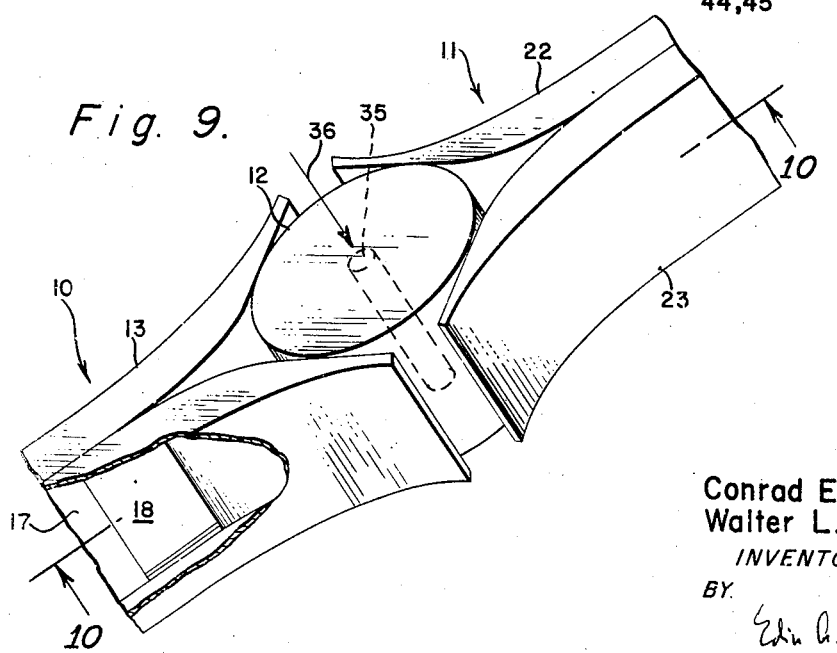
Fig. 9 is a perspective view, partly in cross section, of a fifth embodiment of a reflectionless microwave filter according to the present invention.

Other embodiments of the filter of the present invention are illustrated in Figs. 5 through 10. In these embodiments, waveguide sections 13 and 22 and waveguide sections 14 and 23 are separate and distinct rather than continuous as before and each of them is coupled by means of an individual coupling hole to cavity 12. Thus, as shown in Figs. 6, 8 and 10, waveguide section 13 is coupled to cavity 12 through coupling holes 20 and 28, waveguide section 14 is coupled to cavity 12 through coupling holes 21 and 30, waveguide section 22 is coupled to cavity 12 through coupling holes 42 and 43, and waveguide section 23 is coupled to cavity 12 through coupling holes 44 and 45.

Aside from the fact that waveguide sections 13, 14, 22 and 23 are separate and distinct and each such section is individually coupled electromagnetically to cavity 12, the filter structures of Figs. 5 through 10 are otherwise the same as those of Figs. 1 through 4. Accordingly, the physical description of the embodiments of Figs. 6 through 10 will be confined to what has already been said about them since further information concerning these embodiments may be obtained from the previous descriptions of the embodiments of Figs. 1 through 4.

Considering now the operation of these embodiments, when a signal enters port 15, the electromagnetic energy therein is divided equally by the first 3 decibel directional coupler, that is, coupler 10, so that two signals of equal magnitude but ninety degrees out of time phase with each other are propagated through waveguide sections 13 and 14. These two signals are coupled through coupling holes 20, 21, 28 and 30 to cavity 12 wherein two orthogonal cavity modes are excited of equal amplitude but out of phase with each other by ninety degrees. In the embodiments of Figs. 5 and 6 and Figs. 7 and 8, the modes excited in the cavity are $TM_{110}$ modes whereas in the embodiment of Figs. 9 and 10, the modes excited are $TE_{111}$ modes.

When the frequency of the applied signal is not the same as the resonant frequency of cavity 12, that is, off resonance, the cavity reflects energy back into waveguide section 14 toward port 16. On the other hand, when the frequency of the applied signal is the same as the resonant frequency of cavity 12, that is, at resonance, energy is coupled through the cavity and coupling holes 42, 43, 44 and 45 into waveguide sections 22 and 23 wherein, due to the coupling from waveguide sections 13 and 14 to waveguide sections 23 and 22, respectively, the energy adds in waveguide section 22 and cancels in waveguide section 23. Consequently, the filters are reflectionless and, in addition, are band-elimination between ports 15 and 16 and band-pass between ports 15 and 24.

The advantage of the filters shown in Figs. 5 through 10 over the filters shown in Figs. 1 through 4 is that the isolation between the band-pass ports, that is, ports 15 and 24, is much greater during off-resonance operation. This is true because in the filters of Figs. 1 through 4, the off-resonance band-pass isolation is limited by the directivity of directional coupler 10 from port 15 to port 16 while in the filters of Figs. 5 through 10, the off-resonance isolation is primarily due to the negligible transmission through cavity 12 which provides greater isolation.

As before, by adding a ferrite slug to the circularly polarized radio-frequency magnetic fields in the filter cavity and by applying a direct-current magnetic field to the ferrite, the filter can be made tunable and non-reciprocal. Here again, the cavity end plates are free, that is, unencumbered, either to allow the more direct application of a magnetic field to the ferrite or to permit more convenient temperature compensation of the cavity.

It should be noted that the filters of the present invention may be used in various ways such as, for example, band-pass filters, band-elimination filters, diplexers, and as duplexers for narrow-band radar. When used as a duplexer, for example, a transmitter operating at one of the cavity resonant frequencies is coupled to waveguide section 13 at port 15 in Figs. 5 through 10. A receiver is coupled to waveguide section 23 at port 25 and an antenna is coupled to waveguide section 14 at port 16.

Energy applied to port 15 is divided by aperture 18 and travels along channels 13 and 14. Since cavity 12 is off resonance due to the presence of the ferrite and the particular direction of rotation of the cavity fields, energy is reflected from the cavity and coupled to the antenna at port 16. From there the energy is transmitted into space. Very little, if any, of this incident energy is received by the receiver at port 25. Consequently, during the transmission period, port 25 is at a power null and the radar receiver is effectively isolated from the radar transmitter. On the other hand, energy reflected back by the target and received at port 16 is coupled back into waveguides 13 and 14. Because of the non-reciprocal properties of the ferrite, the cavity is resonant so that the reflected energy is coupled through the cavity to waveguides 22 and 23. This energy is then combined so that it is received solely by the receiver. Thus, during the receiving period, the radar transmitter is effectively isolated from the receiver circuit.

Having thus described the invention, what is claimed as new is:

1. A combination band-pass and band-elimination microwave filter comprising: first and second waveguide directional couplers, each having a pair of equal length waveguide sections and adapted to equally divide therebetween electromagnetic energy propagated therethrough along two diverging portions with the diverging portion of said first coupler connected to that of said second coupler to provide a continuous path, said first coupler having a pair of similarly disposed coupling holes through the associated pair of diverging waveguide sections, respectively; and a microwave cavity structure having end and side walls, said cavity being tuned to the frequency of the propagated energy and having a pair of coupling holes through the cavity side wall spaced from each other in such a manner that the projection of said pair of coupling holes on a plane perpendicular to an axis of said cavity forms an angle of substantially ninety degrees with the projection of said axis on said plane, said cavity being mounted within the diverging portions of said first and second waveguide couplers with the coupling holes of said first coupler in registration with said coupling holes of said cavity side wall to electromagnetically couple energy therebetween.

2. The microwave filter defined in claim 1 wherein said first and second waveguide couplers have a common narrow wall portion between said first and second waveguide sections whereby two $TM_{110}$ modes are excited in said cavity.

3. The microwave filter defined in claim 1 wherein said first and second waveguide couplers have a common broad wall portion between said first and second waveguide sections whereby two orthogonal $TE_{111}$ modes are excited in said cavity.

4. A reflectionless, tunable and non-reciprocal microwave filter comprising: first and second waveguide directional couplers, each coupler having a pair of equal length waveguide sections which for a portion of their lengths are physically separate and adapted to equally divide therebetween electromagnetic energy propagated therethrough with said first and second couplers connected at the separate portions to provide a continuous path, said first coupler having a pair of similarly disposed coupling holes through the associated pair of waveguide sections at the separate portions, respectively; a cylindrical microwave cavity structure having at least a pair of coupling holes through the cylindrical cavity wall spaced from each other in such a manner that the projection of said pair of coupling holes on a plane perpendicular to an axis of said cavity forms an angle of substantially ninety degrees with the projection of said axis on said plane, said cavity being mounted between the physically separate portions of said first and second waveguide couplers with the coupling holes of said first coupler and those of said cavity in registration to provide electromagnetic coupling, said second directional coupler deriving energy from said coupling holes; a slug of ferrite material positioned in said cavity for varying the resonant frequency of said cavity in accordance with the intensity and direction of a magnetic field; and means for applying a magnetic field to said ferrite slug through an end-plate of said cavity, said means including additional means for selectively varying the intensity and direction of said magnetic field.

5. A reflectionless microwave filter comprising: a first waveguide directional coupler including first and second waveguide equal length sections having first and second similarly disposed coupling holes therethrough, respectively, said first and second waveguide sections having a common waveguide wall having an aperture therethrough for equally dividing between said waveguide sections electromagnetic energy propagated therethrough; a second waveguide directional coupler including third and fourth waveguide equal length sections having third and fourth similarly disposed coupling holes therethrough, respectively, said third and fourth waveguide sections having another common waveguide wall having another aperture therethrough for equally dividing between said waveguide sections electromagnetic energy propagated therethrough; and a microwave cavity structure having end and side walls, said cavity being tuned to the frequency of the energy propagated through said first and second couplers and having fifth, sixth, seventh and eighth coupling holes through the cavity side wall equidistantly spaced thereabout in a plane perpendicular to an axis of said cavity, said cavity being mounted between said first and second directional couplers in such a manner that said fifth and sixth coupling holes are aligned with said first and second coupling holes, respectively, for electromagnetically coupling said cavity to said first and second waveguide sections, and said seventh and eighth coupling holes are aligned with said third and fourth coupling holes, respectively, for electromagnetically coupling said cavity to said third and fourth waveguide sections.

6. A reflectionless, tunable and non-reciprocal microwave filter comprising: a first waveguide directional coupler including first and second equal length waveguide sections having first and second similarly disposed coupling holes therethrough, respectively, said first and second waveguide sections having a common waveguide wall having an aperture therethrough for equally dividing between said waveguide sections electromagnetic energy propagated therethrough; a second waveguide directional coupler including third and fourth equal length waveguide sections having third and fourth similarly disposed coupling holes therethrough, respectively, said third and fourth waveguide sections having another common waveguide wall having another aperture therethrough for equally dividing between said waveguide sections electromagnetic energy propagated therethrough; a microwave cavity structure having end and side walls, said cavity being tuned to the frequency of the energy propagated through said first and second couplers and having fifth, sixth, seventh and eighth coupling holes through the cavity side wall equidistantly spaced thereabout in a plane perpendicular to an axis of said cavity, said cavity being mounted between said first and second directional couplers in such a manner that said fifth and sixth coupling holes are aligned with said first and second coupling holes, respectively, for electromagnetically coupling said cavity to said first and second waveguide sections and said seventh and eighth coupling holes are aligned with said third and fourth coupling holes, respectively, for electromagnetically coupling said cavity to said third and fourth waveguide sections; a slug of ferrite material positioned in said cavity for varying the resonant frequency of said cavity in accordance with the intensity and direction of a magnetic field; and means for applying a magnetic field to said ferrite slug through an end-plate of said cavity, said means including additional means for selectively varying the intensity and direction of said magnetic field.

References Cited in the file of this patent

UNITED STATES PATENTS

| | | |
|---|---|---|
| 2,586,993 | Riblet | Feb. 26, 1952 |
| 2,626,990 | Pierce | Jan. 27, 1953 |
| 2,645,758 | Van De Lindt | July 14, 1953 |
| 2,671,884 | Zaleski | Mar. 9, 1954 |
| 2,825,765 | Marie | Mar. 4, 1958 |

FOREIGN PATENTS

| | | |
|---|---|---|
| 980,648 | France | Dec. 27, 1950 |
| 64,770 | France | June 29, 1955 |

OTHER REFERENCES

Spencer et al.: Proceedings of the IRE, vol. 44, No. 6, June 1956, pages 790–800.

Thompson: Journal of the British Institution of Radio Engineers, vol. 16, No. 6, June 1956, pages 311–328.